United States Patent
Merz et al.

[11] Patent Number: 6,113,287
[45] Date of Patent: Sep. 5, 2000

[54] MAGNETIC ORIENTATION PROCESS AND DEVICE

[75] Inventors: Gary E. Merz; Edward B. Richter; Steven P. Vogel, all of Rochester; Garry L. Wohlschlegel, Hemlock; Joseph E. Yokajty, Webster, all of N.Y.

[73] Assignee: Eastman Kodak Company, Rochester, N.Y.

[21] Appl. No.: 09/212,455

[22] Filed: Dec. 16, 1998

[51] Int. Cl.[7] ............................. G03B 17/24; B21D 39/03

[52] U.S. Cl. ............................ 396/515; 29/428; 29/464; 206/578; 242/348.4

[58] Field of Search ..................... 396/6, 388, 429, 396/511, 512, 515; 242/348.4, 338.1, 588.5, 338.2, 588.6, 348; 206/397, 407, 408, 389, 578; 29/428, 464

[56] References Cited

U.S. PATENT DOCUMENTS

| | | |
|---|---|---|
| 5,708,879 | 1/1998 | Manico et al. . |
| 5,709,022 | 1/1998 | Shimizu et al. ........................ 29/434 |
| 5,715,494 | 2/1998 | Harris et al. . |
| 5,743,482 | 4/1998 | Suzuki et al. ...................... 242/533.4 |
| 5,953,806 | 9/1999 | Suzuki et al. .......................... 29/430 |

*Primary Examiner*—David M. Gray
*Attorney, Agent, or Firm*—Mark G. Bocchetti; Arthur H. Rosenstein

[57] ABSTRACT

A magnetic orientation process has been developed for the assembly of additional features to film cartridges to minimize the impact of the existing manufacturing process. This process orients the assembled film cartridge after it has been inserted into the packaging canister allowing an exposed film indicator to be added to the cartridge after it has been fully assembled and inserted into the canister. The orientation process uses magnetics to consistently orient the cartridge in the canister for subsequent assembly operations.

14 Claims, 4 Drawing Sheets

MAGNETIC ORIENTATION PROCESS AND DEVICE

FIELD OF THE INVENTION

The invention relates generally to the field of manufacturing, and in particular parts manufacturing and assembly.

BACKGROUND OF THE INVENTION

What is needed in the art is a film cartridge which will indicate whether the film in the cartridge has been exposed.

Recently there has been a desire by snap-shooters, photo enthusiasts, and professionals to be able to determine if a roll of film has been advanced through a camera or has never been used. This can be accomplished by attaching an exposed film indicator to the long end of the spool on a 35 mm cartridge. This is primarily needed when shooting multiple rolls of film, or for the purpose of some consumer and professional cameras, when a roll is only partially exposed to be used again later.

One problem involving assembling the exposed film indicator to the cartridge, is developing a method to reliably attach two thin disks to the long hub end of the spool. The inner (or exposed) disk is attached to the spool hub by three barbs and therefore rotates with the spool. The word EXPOSED may be printed on it, or to differentiate from the outer disk, it may be a different color. The outer (or unexposed) disk is attached to the crimp diameter of the end cap. It remains stationary relative to the cartridge. The word UNEXPOSED may be printed on it, or, again to differentiate from the inner disk, it may be a different color. When a customer purchases a fresh roll of film, the outer disk will be visible. As film is wound back into the cartridge after the pictures are taken, a tab that sticks up on the inner disk engages a tab that sticks down on the outer disk. The inner disk then exits through a slot in the outer disk and is visible to the customer.

U.S. Pat. No. 5,708,879 shows a film cartridge with a visual exposure status indicator.

U.S. Pat. No. 5,715,494 is another example of a film cartridge with a visual exposure status indicator.

To implement adding exposure indication to a 35 mm film cartridge in a timely and cost effective manner, it is necessary to minimize the impact on the existing manufacturing infrastructure. Given the complexity of this infrastructure and the space constraints around the equipment, it is highly desirable to add the feature after the film cartridge is completely assembled. Since the completed film cartridge is loaded into the canister at the end of the film winding operation, the feature must be assembled to the cartridge either by removing the cartridge from the canister or while the cartridge is in the canister. It is advantageous to assemble the feature to the film cartridge while it is in the canister since:

1) The canister provides a convenient method of conveying and singulating the film cartridges for the assembly operations.
2) It is difficult to reinsert the film cartridge back into the canister without using a special motion to wrap the film leader around the cartridge.
3) Reduced handling of the cartridges and thus the potential for cosmetic damage to either the cartridge or the film leader is reduced.
4) Equipment space limitations does not permit cartridge removal.

SUMMARY OF THE INVENTION

The above problem of applying an exposed film indicator to the cartridge after assembly of the cartridge is solved by the magnetically orienting process described herein.

The assembly process will accept the canned cartridges opened end up, either from a tray unloader or from a centrifugal feeder. Individual canisters will be singulated on the infeed conveyor, using a separator screw. They will then be loaded onto either a continuous motion rotary assembly turret, a dial indexer or some type of assembly chassis. Using this motion generated by the chassis, this process can be used to find the center of the spool and orient them all the same way so that the exposed film indicator can be applied.

Each nest in the assembly device will contain a powerful rare earth magnet. A stationary belt device on the outer periphery of the device will contact the canister. Because the canister, which is in the nest, with the cartridge inside is rotating past and contacting a stationary belt, the frictional force developed between the canister and belt will cause the canister to rotate. The steel magazine, which is inside the canister, is not truly round, but has a flat section above the film exit slot. As the canister rotates, the flat section of the magazine will be attracted to the magnet with sufficient force that the cartridge will cease to rotate, even as the canister continues to rotate. Thus all the cartridges will be oriented consistently relative to the assembly tooling and the center of the spool will be in a known position.

Once the center of the spool has been found, the exposed film indicator components will be applied with a straightline vertical motion with respect to the cartridge.

It is noted, that if desired the functionality of the exposed film indicator can be reversed by having the inner disk designated as unexposed and the outer disk designated as exposed and assembled to the cartridge in reverse order.

BRIEF DESCRIPTION OF THE DRAWINGS

The foregoing and other objectives, features, and advantages of the invention will be apparent from the following more particular description, including the presently preferred embodiments of the invention, as illustrated in the accompanying drawings in which.

DETAILED DESCRIPTION OF THE INVENTION

Figure 1A:
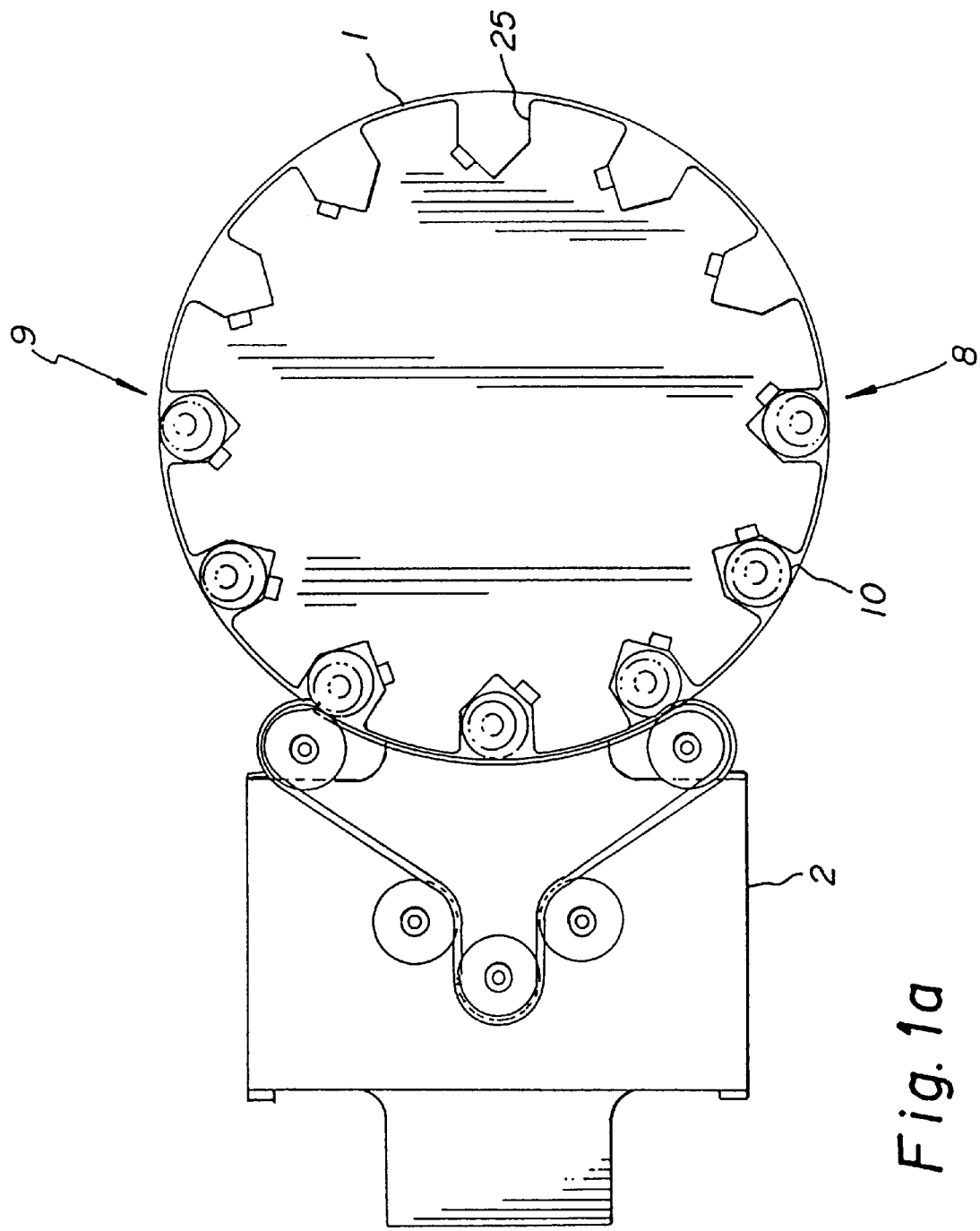
FIGS. 1a and b show overall top and side views of the magnetic orienting device.
Figure 1B:
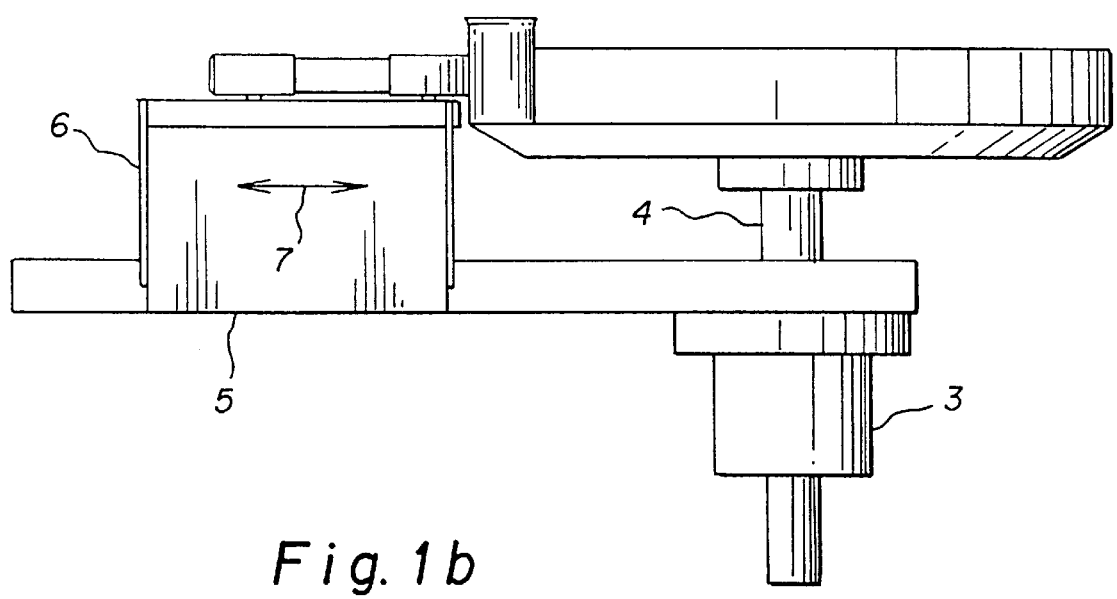

FIG. 1a shows a device 1 which rotates clockwise with twelve pockets 25. Also shown is the belt device 2 and the bearing housing 3. The pocket is defined in more detail in FIG. 3. Attached to the shaft 4 below the bearing housing 3 (see FIG. 1b), but not shown for clarity is a rotational drive device, such as a motor. The purpose of the belt device 2 is to provide a means to present a stationary, but flexible surface to the product 10, which will develop sufficient force to cause the product 10 to spin, but is compliant enough to not damage the product 10 and is able to follow the contour of the device and product assembly. The belt device 2 is attached to a common plate 5 through a series of long thin members 6 which act as leaf springs 6. This allows the belt device to have some compliance in the direction 7 as shown by the arrow. Typically a conveyor would feed the product 10 into the device at position 8, and remove it from the device at position 9. The conveyor also is not shown for clarity.

Figure 2:
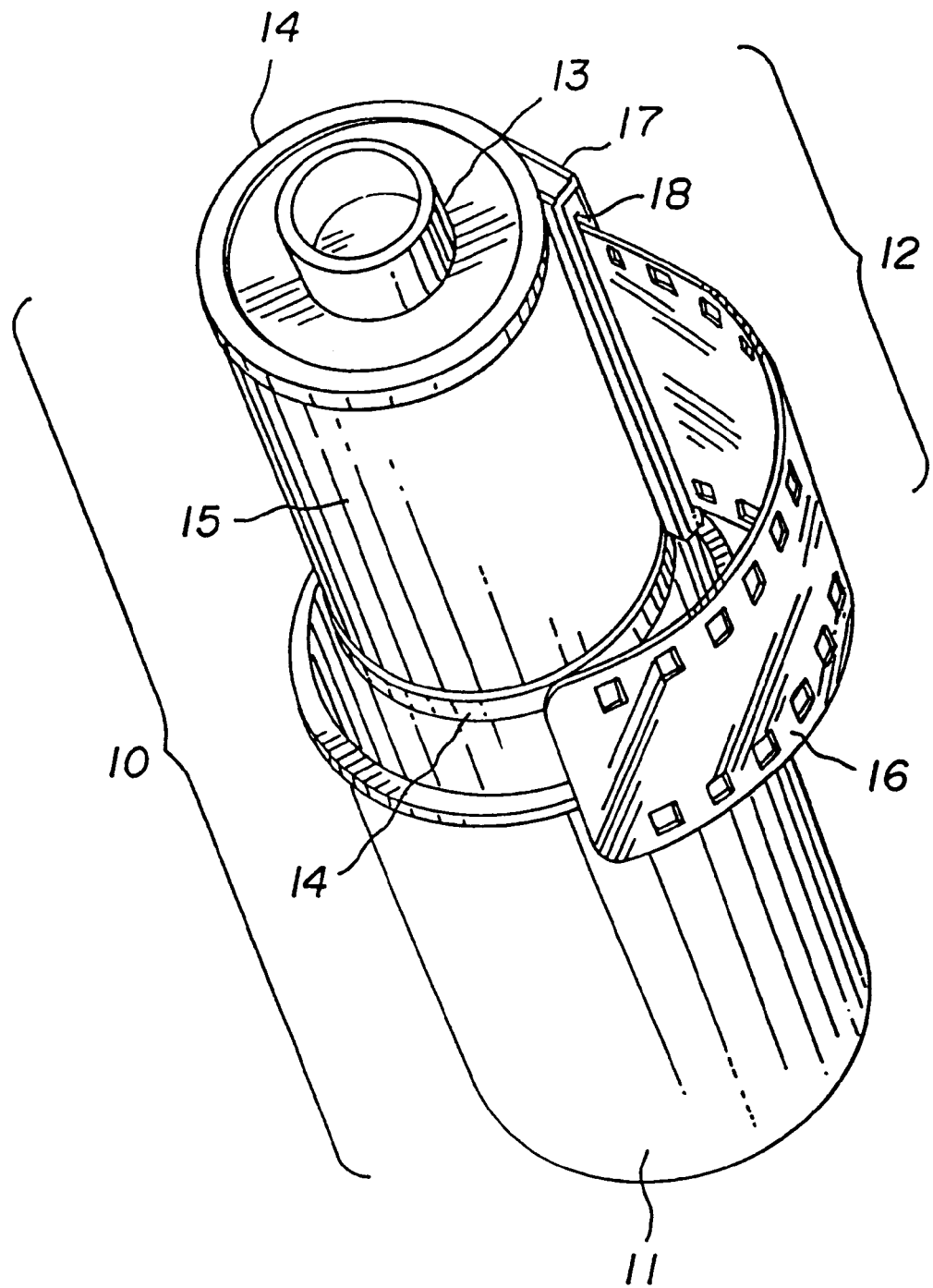
FIG. 2 is an exploded view of the product, typically a 35 mm film cartridge and a canister.

FIG. 2 is an enlarged view of the product assembly 10 which consists of a plastic canister 11 and a cartridge 12, such as a 35 mm film cartridge. The cartridge 12 is made up of a spool 13, preferably made of plastic, a steel shell, or magazine 15 and two steel end caps 14, which are staked onto the ends of the magazine 15. There is a flat section 17 on the magazine 15 where the film exits the cartridge 12. Protruding out of the cartridge 12 (preferably, approximately 58 mm) through the exit slot 18 in the flat section is the film leader 16. The film leader 16 tends to act as a leaf spring and pushes the cartridge 12 up against the inside wall of the canister 11 on the side opposite from where the film exits the cartridge. This phenomenon helps hold the cartridge 12 in one place relative to the inside of the canister 11. Note that the cartridge 12 is free to move anywhere within the confines of the canister 11.

Figure 3:
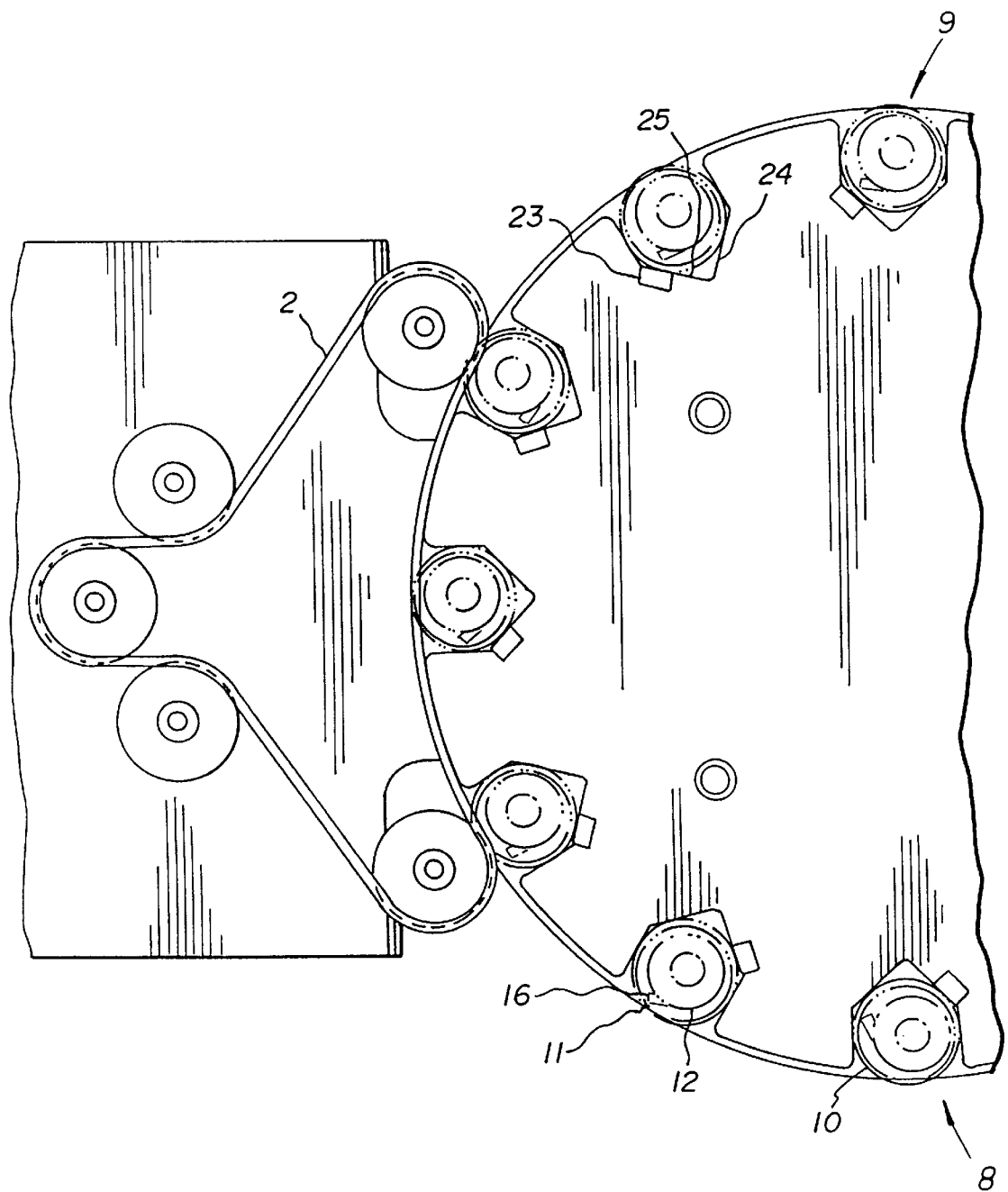
FIG. 3 is an enlarged view of the magnetic orienting device, showing the area where the device, product and belt interface.

FIG. 3 is an enlarged view of the area where the device 1, containing twelve pockets 25, the belt device 2, and product 10, come together. The pocket 25 is a means to capture the product assembly. Each pocket 25 contains a magnet 23 and a machined surface 24, opposed to the magnet 23 and a floor for the product to sit on. It is important that these two surfaces are approximately 90° apart so that they form and act as a "V" Block. The rest of the surfaces in each pocket 25 are used to help guide the product 10 into the pocket 25. At position 8, the product 10 is shown as it would be inserted randomly into the pocket 25 on the device 1. As the device 1 rotates in a clockwise direction towards position 9 the canister 11 will come in contact with a stationary belt device 2. At this point the canister is captured between the belt device 2, the magnet 23 and the machined surface 24 on the pockets 25. The canister 11 is trapped between the belt device 2 and the pocket 25 on the moving device 1, and therefore can not move laterally. The canister 11 contained in the pocket 25 and being dragged across the belt device 2 will begin to rotate (similar to a wheel being dragged across a surface). As previously stated, because the film leader 16 acts as a leaf spring, and develops enough force to hold the cartridge 12 in place relative to the canister 11, the cartridge 12 also rotates with the canister 11. As the device 1 continues to rotate, the canister 11 rotates in the opposite direction. Once the flat section 17 of the magazine 15 rotates to a position in proximity to the magnet 23, the magnetic force attracts this flat section 17. By using a rare earth magnet, which generates a strong magnetic force field, the force generated by the magnet 23 is larger than the force generated by the leaf spring action caused by the leader. Therefore the cartridge 12 will stop rotating and the flat section 17 with stay aligned with the magnet 23. The canister 11 will then continue to rotate until the pocket 25 containing the product assembly 10 reaches the end of the belt device 2. At this point, there is no longer a force being applied to the canister 11 to cause it to rotate, hence the canister 11 will stop rotating. The cartridge 12 however, will remain stationary with the flat section aligned with the magnet 23. The canister 11, with the cartridge 12 in a known rotational orientation and position, can continue to travel with the device 1 to downstream assembly operations as warranted.

Thus using magnetics, the center of the spool can be located consistently for assembly of the exposed film indicator while it is in the canister, and the orientation of the cartridge relative to the device is adjusted to a consistent position.

The many features and advantages of the invention are apparent from the detailed specification and thus it is intended by the appended claims to cover all such features and advantages which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

| PARTS LIST | |
|---|---|
| 1 | Device |
| 2 | Belt device |
| 3 | Bearing Housing |
| 4 | Shaft |
| 5 | Base Plate |
| 6 | Leaf Springs |
| 7 | Direction of Movement for Belt Compliance |
| 8 | Starting Position |
| 9 | Ending Position |
| 10 | Product Assembly |
| 11 | Canister |
| 12 | Cartridge Assembly |
| 13 | Spool |
| 14 | End Caps (2) |
| 15 | Magazine |
| 16 | Film Leader |
| 17 | Flat Section of Magazine |
| 18 | Film Exit Slot |
| 23 | Magnet |
| 24 | Machined Surface of Pocket |
| 25 | Pocket (12 on Device) |

What is claimed is:

1. A process of assembling an exposed film indicator to a cartridge after said film has been placed in said cartridge, containing a spool, said cartridge being in a canister in a nest, the process comprising:

a) placing the canister containing a cartridge in a pocket of a device having a magnet and a machined surface attached thereto, and rotating the device clockwise;

b) positioning a non-rotating belt device on a portion of a circumference of said device;

c) rotating the device so that the canister contained in the pocket on the device brushes against the belt device, causing it to rotate;

d) continuing to rotate the device clockwise so that the cartridge is held in place relative to the canister and the canister rotates counterclockwise; and e) continuing to rotate the device until the canister reaches a position away from the belt device and the canister stops rotating.

2. The process of claim 1 wherein the film is a 35 mm cartridge with a protruding film leader.

3. The process of claim 1 wherein the magnet and machined surfaces form a V-shape and are approximately 90° apart.

4. The process of claim 1 wherein the device contains a plurality of pockets with a plurality of magnets and machined surfaces.

5. The process of claim 1 wherein the belt device contacts the canister.

6. The process of claim 1 wherein the device is a continuous motion rotary turret.

7. The process of claim 1 wherein the device is a dial indexer.

8. The process of claim 1 wherein the device is an assembly chassis.

9. An apparatus for orienting a film cartridge in a canister to a consistent position comprising:
 a) a device containing at least one pocket, each pocket containing a magnet and machined surfaces; and
 b) a belt device which is capable of brushing against said canister while said device is rotating clockwise and subsequently releases said canister which is located in said pocket on said device.

10. The apparatus of claim 9 wherein said magnets and said machined surfaces form a V-shape which are approximately 90° apart.

11. The apparatus of claim 9 wherein the device contains a plurality of pockets.

12. The apparatus of claim 9 wherein the device is a continuous motion rotary turret.

13. The apparatus of claim 9 wherein the device is a dial indexer.

14. The apparatus of claim 9 wherein the device is an assembly chassis.

* * * * *